Oct. 17, 1933.    H. A. OSBORNE    1,930,596
METHOD OF PREPARING SOLES FOR BOOTS AND SHOES
Filed Nov. 11, 1931
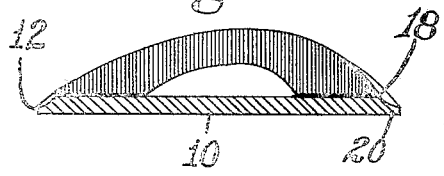
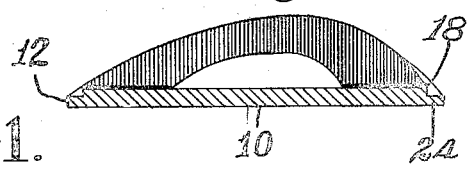
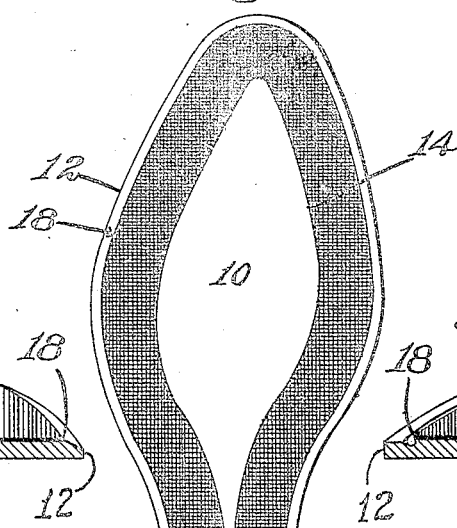
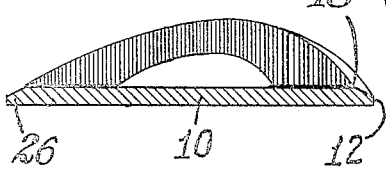
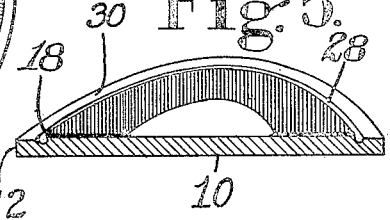
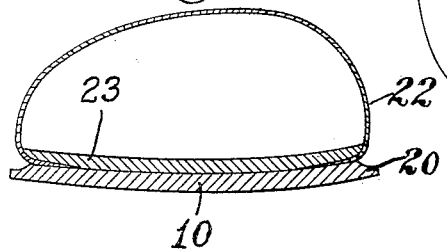
INVENTOR
Harold A. Osborne
By his Attorney
Harlow M. Davis Patented Oct. 17, 1933

1,930,596

UNITED STATES PATENT OFFICE 1,930,596

METHOD OF PREPARING SOLES FOR BOOTS AND SHOES

Harold A. Osborne, Swampscott, Mass., assignor to United Shoe Machinery Corporation, Paterson, N. J., a corporation of New Jersey Application November 11, 1931
Serial No. 574,373

11 Claims. (Cl. 12—146)

This invention relates to the manufacture of boots and shoes and more particularly to methods of preparing soles for attachment to lasted shoes. The invention is herein illustrated with reference to soles of which the foreparts and shanks are intended to be attached with adhesive cement, irrespective of whether the heel-seat portions thereof are to be secured by adhesive cement or by other means, such as nails, tacks, or pegs.

In the manufacture of cemented shoes, it is now common to use a quick-drying pyroxylin cement to secure outsoles to the bottoms of the uppers. For the sake of brevity the term "cement" is used herein to mean any suitable adhesive substance. The use of a cement for attaching outsoles presents, among other problems, that of controlling the application of the cement to the soles so that the cement will be restricted to those areas that are intended to adhere to the bottoms of lasted shoes and will not extend to any area or areas that will be exposed to view when the shoes are finished. It is particularly objectionable to use soles having cement extending quite to the perimeters of their upper surfaces, since cement lying too near the perimeter of a sole not only interferes with the production of a well-defined crease between the upper and the sole but also interferes with the operation of certain tools, such as edge-trimming cutters and burnishing irons, with which the edges of the soles are commonly finished after the soles have been attached.

To avoid the presence of cement on the outer bands of outsoles, it has been proposed to cut away the outer bands after the attaching faces have been coated with cement and after the coatings have set or hardened. Although a sole may be satisfactorily prepared in that manner the method of procedure has certain objections, one of which is that the trimming cutters used to cut away the outer bands are so quickly dulled by the cement that production is seriously retarded in consequence of the time lost in removing the cutters from the trimming machines, sharpening them and replacing them. Another objection to that procedure is that it wears out about four or five times as many cutters as it would if the cutters did not encounter any cement.

With regard to the conditions above set forth, an object of the present invention is to provide improvements in methods of preparing soles intended to be attached to lasted shoes with cement.

To this end, an improvement provided by the present invention consists in shaping the perimeter of a sole to substantially final configuration, forming an edge or shoulder parallel to, and a short distance from, the perimeter of the sole in the forepart thereof, if not also in the shank, by removing some of the sole-stock from the outer band of the attaching face thereof, and thereafter applying cement to the attaching face without applying cement between the perimeter and the boundary defined by said shoulder. In consequence of removing some of the stock from the outer band of a sole, the newly formed surface of the outer band is placed below the level of the attaching face, the better to avoid the application of cement to the outer band incidentally to coating the attaching face with cement.

It is commonly desirable to reduce the thickness of the margins of the outsoles used in women's shoes, particularly in the foreparts and shanks, leaving the bodies of the foreparts, shanks and usually also the heel-seat portions thicker than the edges. The present invention lends itself readily to these conditions in the following manner. Assuming that a sole intended to be attached with cement is also intended to have a perimeter thinner in the forepart and shank than the body of the sole, the thinning of the perimeter may conveniently be accomplished incidentally to forming the shoulder that is to be the outer boundary of the cement-receiving area. The forming of the shoulder and the reducing of the perimeter may conveniently be performed, for example, with a machine having a rotary feather-edging cutter, of which one or more types can readily be obtained.

Referring to the accompanying drawing,

Fig. 1 represents a plan view of the attaching face of a sole that has been prepared in accordance with the present invention;

Figs. 2, 3, 4, and 5 represent cross-sectional views of prepared soles embodying various modifications which differ one from another chiefly in that cuts of different form have been made to chamfer their outer bands and to form the boundaries of their cement-receiving areas; and Fig. 6 represents a cross-sectional view through the forepart of a cemented shoe, the outsole of which has been prepared and attached in accordance with this invention.

Assuming that a sole 10 has been rounded or otherwise cut to substantially final configuration as represented in Fig. 1, its attaching face, that is, the flesh face of a leather sole, should be roughened along the margin of its forepart and shank portion to prepare the fibers for affording the greatest possible strength of adhesion of the cement subsequently to be applied thereto, although this roughening operation may be omitted if conditions do not require it. However, if a roughening operation is performed it may be confined to a stripe or band from ½ to ¾ of an inch in width with its inner boundary located substantially as represented by line 14. The band thus roughened should extend around the forepart and along the shank portion of the sole and may extend some distance into the heel-seat portion 16, as represented by horizontal shade lines in Fig. 1, but it is not commonly necessary to continue the roughening around the rear end of the heel-seat portion because it is common to secure that portion to a lasted shoe with nails, tacks, or pegs. Moreover, if the sole is to be subjected to a roughening operation, it is preferable to perform that operation next after the sole has been cut to its final configuration, since the operation next to be described will remove the outer band of the roughened area and provide a smooth, even surface adjacent to the perimeter 12.

The next step to be performed is that of chamfering the margin of the sole in the forepart and preferably also in the shank, by cutting off the outer band of the attaching face to a uniform depth and thus forming a shoulder represented by the line 18 in Fig. 1. A feather-edging machine equipped with a rotary toothed cutter may be used for this purpose. If the sole has been previously roughened as above described, the chamfering of the margin will not only remove a relatively narrow band of the roughened surface and provide a smooth surface in its stead, but will also reduce the area of the face to coact with cement. Moreover, the newly formed surface imparted to the margin by a chamfering cutter will be below the level of the cement-receiving area of which the outer boundary is established by the shoulder 18. Consequently, when cement is subsequently applied to the reduced area within the boundary thus defined, the deposit of cement outside the boundary may be readily avoided, since a cement-applying device, such as a hard-surfaced roll or nozzle, may run on the intended cement-receiving surface without engaging the narrow outer band below the level of that surface. This procedure avoids the necessity of trimming the sole in any manner between the step of applying cement thereto and the step of attaching the sole to a shoe. The chamfered band and the shoulder 18 will preferably extend throughout the forepart and the shank portion and may also extend into the heel-seat portion of the sole.

Figs. 2, 3, 4, and 5 illustrate various modifications of soles thus chamfered, in each of which the boundary shoulder is indicated by the numeral 18, but these modifications differ one from another with regard to the profile of the sole-stock outside or beyond the shoulder. The relatively heavy horizontal lines in these figures represent cross-sections of cement.

In Fig. 2 the shoulder 18 is formed by cutting a concave bevel on the outer band of the margin of the sole. The reduced portion 20 thus trimmed will project beyond the junction of the sole with the upper 22 after the sole has been attached to a shoe, as illustrated in Fig. 6.

In the modification illustrated in Fig. 3, the reduced projecting portion 24 is similar in principle to the portion 20 shown in Figs. 2 and 6 but the shoulder 18 is more abrupt than that illustrated in those figures.

In the modification illustrated in Fig. 4, a less abrupt shoulder or ridge 18 is formed by beveling the outer band 26 of the margin.

Fig. 5 illustrates a modification in which a shoulder 18 is formed by cutting a groove 28 in the margin. The thickness of the outer band of the margin between the groove 28 and the sole edge 12 is reduced slightly to place the upper surface 30 of the outer band slightly below the level of the intended cement-receiving face of the sole. A sole of this type would be preferable for a shoe in which it is not desirable to give the sole an appearance of extreme lightness. For example, a sole prepared in this manner would be useful for some types of men's shoes and boys' shoes.

The next step in the preparation of the sole is to apply cement to the attaching face thereof. This may be done with a roll, a nozzle, or a brush preferably little, if any, wider than the roughened band between the shoulder 18 and the inner boundary 14. If a roll is used, a hard-surfaced roll will be preferable, since a roll of that character may run on the roughened area without applying cement to the reduced outer band of the margin, even though one end of the roll projects outside or beyond the shoulder 18. If a nozzle or a brush is used, its contact with the sole must be restricted to the area within the boundary defined by the shoulder. In any event, the application of cement exclusively within the area thus defined may be facilitated by the use of an edge-gage in fixed relation to the cement-applying device and arranged to run on the perimeter 12 of the sole. Whether the cement-applying device is moved by hand along the margin of the sole or whether the sole is moved while the cement-applying device remains stationary, an edge-gage suitably located in fixed relation to the cement-applying device will not only avoid applying cement to the reduced outer band of the margin but will also insure applying the cement to a band of uniform width inside the shoulder.

In Fig. 1 the band of the sole between the shoulder 18 and the line 14 is shaded with horizontal lines intended to represent a roughened condition imparted to the attaching face prior to the application of cement and prior to the chamfering operation by which the outer band 12, 18 is reduced in thickness and rendered smooth. In this figure also the band between the shoulder 18 and the line 14 is shaded with vertical lines representing a band or stripe of cement however applied.

The sole illustrated in Fig. 5 differs from soles heretofore provided in that it has a trough or channel in its upper surface formed by the groove 28. If, incidentally to applying cement to the attaching face of a sole of this type, a small quantity of cement should run over the shoulder 18 it will be confined in the trough without running out upon the surface of the outer band between the trough and the perimeter of the sole.

Fig. 6 illustrates a typical example of a cemented shoe provided with an outsole of the form illustrated in Fig. 2. The upper 22 of the shoe is secured to an insole 23 by cement. After the shoe has been lasted and after the bottom thereof has been trimmed to remove pleats, crimps, or other irregularities that commonly develop at the toe end, the overdrawn margin of the upper that lies on the insole is subjected to a roughening operation whereby it is reduced in thickness. This margin of the upper is subsequently coated with cement and the cement is permitted to set or harden. A sole 10, prepared as hereinbefore set forth, may be attached in accordance with common practice, which consists in applying a volatile solvent to the coating of cement on either the upper or the outsole, or both. The solvent may be applied to the outsole with a narrow brush without applying any to the band outside the shoulder. While the cement is in a tacky condition as a result of applying a solvent, the outsole is laid and the shoe is immediatly placed in a suitable press by which the sole is conformed to the bottom of the lasted shoe and held under pressure in that condition until the bond of adhesion has acquired sufficient strength to maintain a tight and close union of the elements without external force.

Having thus described my invention, what I claim as new and desire to secure by Letters Patent of the United States is:

1. That improvement in methods of preparing soles for attachment to lasted shoes which consists in shaping the perimeter of a sole to final configuration, forming a shoulder approximately parallel to, and a short distance from, the perimeter of the sole by removing some of the sole-stock from the outer band of the attaching face, and thereafter applying cement to the attaching face without applying cement between the perimeter and the boundary defined by said shoulder.

2. That improvement in methods of preparing soles for attachment to lasted shoes which consists in shaping the perimeter of a sole to final configuration, forming a shoulder approximately parallel to, and a short distance from, the perimeter in the forepart by removing some of the sole-stock from the outer band of the attaching face, and thereafter applying a coating of cement to the attaching face in such manner that the outer boundary of the cement will coincide with said shoulder.

3. That improvement in methods of preparing soles for attachment to lasted shoes which consists in shaping the perimeter of a sole to final configuration, forming a shoulder approximately parallel to, and a short distance from, the perimeter of the sole by removing some of the sole-stock from the outer band of the attaching face, and thereafter applying a band or stripe of cement to the attaching face inside and parallel to the boundary defined by said shoulder without applying cement between said boundary and the perimeter of the sole.

4. That improvement in methods of preparing soles for attachment to lasted shoes which consists in shaping the perimeter of a sole to final configuration, roughening the marginal portion of the attaching face of the sole, forming a shoulder approximately parallel to, and a short distance from, the perimeter of the sole by trimming some of the sole-stock from the outer band of the attaching face and thereby imparting a smooth surface to said band, and thereafter applying cement to the attaching face without applying cement to said smooth surface.

5. That improvement in methods of preparing soles for attachment to lasted shoes which consists in shaping the perimeter of a sole to final configuration, forming a shoulder approximately parallel to, and a short distance from, the perimeter by cutting off a selected range of the length of the outer band of the attaching face to a uniform depth, and thereafter applying cement to the attaching face adjacent to said shoulder without applying cement to said outer band.

6. That improvement in methods of preparing soles for attachment to lasted shoes which consists in shaping the perimeter of a sole to final configuration, forming a shoulder on the attaching face of the sole by chamfering that face through a selected range of the perimeter, and thereafter transferring cement from a hard-surfaced cement-applying element to the attaching face by relatively moving said element and the sole in cement-transferring relation without applying cement to the margin of the sole outside said shoulder.

7. A step-product of manufacture consisting of an unattached shoe-sole of substantially final configuration having an uncemented attaching face roughened for the reception of sole-attaching cement, a shoulder defining the outer boundary of said face, and a relatively thin marginal extension the upper surface of which is below the plane of said roughened attaching face.

8. A step-product of manufacture consisting of an unattached shoe-sole of substantially final configuration having an uncemented attaching face roughened for the reception of sole-attaching cement, a shoulder sharply defining the outer boundary of said attaching face, and a relatively thin marginal extension of wedge-shaped cross-section outside said shoulder and below the plane of the attaching face.

9. An improved article of manufacture consisting of an unattached shoe-sole of substantially final configuration having an attaching face, a shoulder defining the outer boundary of said face, a groove at the base of said shoulder, and a marginal extension outside said groove, the upper surface of said marginal extension being below the plane of said attaching face.

10. An improved article of manufacture consisting of an unattached shoe-sole of substantially final configuration having a cement-coated attaching face, an abrupt shoulder sharply defining the outer boundary of said face, a marginal extension outside said shoulder, the upper surface of said extension being cement-free and below the plane of said attaching face, and a groove in said upper surface of the extension parallel to and at the base of said shoulder.

11. That improvement in methods of preparing soles for attachment to lasted shoes which consists in shaping the perimeter of a sole to final configuration, roughening a marginal band of the attaching face of the sole for the reception of cement, and thereafter, but before applying any cement to the sole, reducing the area of the attaching face and the thickness of the perimeter of the sole by cutting away a narrow band of the attaching face from the boundary thereof.

HAROLD A. OSBORNE.

CERTIFICATE OF CORRECTION.

Patent No. 1,930,596.

October 17, 1933.

HAROLD A. OSBORNE.

It is hereby certified that error appears in the printed specification of the above numbered patent requiring correction as follows: Page 2, line 38, for "coact" read be coated; and that the said Letters Patent should be read with this correction therein that the same may conform to the record of the case in the Patent Office.

Signed and sealed this 5th day of December, A. D. 1933.

F. M. Hopkins (Seal)

Acting Commissioner of Patents.